US007209806B2

(12) United States Patent
Timm

(10) Patent No.: US 7,209,806 B2
(45) Date of Patent: Apr. 24, 2007

(54) SELF-CONTAINED ELECTRONIC PRESSURE MONITORING AND SHUTDOWN DEVICE

(76) Inventor: Miguel A. Timm, 17319 Cypress Spring Dr., Spring, TX (US) 77388

( * ) Notice: Subject to any disclaimer, the term of this patent is extended or adjusted under 35 U.S.C. 154(b) by 846 days.

(21) Appl. No.: 10/626,346

(22) Filed: Jul. 25, 2003

(65) Prior Publication Data

US 2005/0021189 A1 Jan. 27, 2005

(51) Int. Cl.
*G05D 16/00* (2006.01)

(52) U.S. Cl. .......................... 700/301; 700/282; 137/7; 137/12; 137/71; 137/81.1

(58) Field of Classification Search ................ 700/282, 700/301; 137/7, 12, 71, 81.1
See application file for complete search history.

(56) References Cited

U.S. PATENT DOCUMENTS 4,462,301 A * 7/1984 Goans ........................... 92/48
4,485,727 A * 12/1984 Shollenbarger ............. 92/13.2
4,616,670 A * 10/1986 Duffy et al. .................. 137/84
4,676,140 A * 6/1987 Haussler ...................... 91/452
5,213,133 A * 5/1993 Ellett .................... 137/596.14
5,412,616 A * 5/1995 Gonzalez ..................... 367/13
5,464,040 A * 11/1995 Johnson ...................... 137/556
5,590,685 A * 1/1997 Johnson ...................... 137/552
6,276,135 B1 * 8/2001 Ellett ......................... 60/477
6,302,129 B1 * 10/2001 Van Dewerker ............. 137/12
2004/0078117 A1 * 4/2004 Vanderah et al. ........... 700/301

* cited by examiner

*Primary Examiner*—Michael D. Masinick

(57) ABSTRACT

The invention is a self-contained process shutdown device that detects abnormal pressures and initiates shutdown by removing the pneumatic or hydraulic pressure needed for a given process or flow to continue. The process' pressure is detected by means of a switch-gauge (a pressure gauge with high and low alarm electrical contacts) which has a pressure sensing port connected to the monitored pressure. The contacts from the switch-gauge are connected to an electronic logic circuit that sends one or more shutdown pulses to trip a pulse driven solenoid and initiate the shutdown. This device provides indicator lamps to show statuses and alarms as well as switch or pushbuttons to activate the "Reset" and "Test" functions.

The electrical power is supplied by a power module that is constituted of battery cells connected in such way that it provides a dual voltage output to feed the electronic logic separate from the pulse driven solenoid driver circuit. Alternatively, the power module may be constituted of a circuit made of a photovoltaic module, voltage regulator circuits and three main capacitors with enough capacitance to keep the electronic logic circuit and the solenoid valve driver circuit operating throughout the night or longer.

5 Claims, 3 Drawing Sheets

SELF-CONTAINED ELECTRONIC PRESSURE MONITORING AND SHUTDOWN DEVICE

CROSS REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates to the field of industrial safety to shutdown a process or flow when the fluid reaches an unsafe pressure. In the event of detecting an alarm condition the invented device will provide a pneumatic or hydraulic signal to cause a safety shutdown.

DESCRIPTION OF RELATED ART

As shown in the reference U.S. Pat. Nos. 6,276,135; 5,213,133; 4,616,670 and 4,485,727 the prior art has an abundance of diverse process shutdown systems.

While the prior art inventions are adequate for the basic purpose and function for which they have been designed, they fail to provide a simple, reliable and ergonomic device that monitors the process' pressure and initiates shutdown when the sensed pressure falls out of the preset limits. A number of the prior art devices have sliding seals that are prone to become frozen after some time because of lubricants drying out, creating the need for frequent preventive maintenance by highly specialized instrumentation personnel. Another type of device seen on the prior art resorts to bourdon tubes that directly control pneumatic valves which leads to very delicate mechanisms, expensive and prone to failures.

Adding to the above disadvantages, some of the devices shown on the prior art have just one alarm point, creating the need of two separate devices to protect against high and low pressure conditions. Furthermore, the operators have little means to know the mechanical conditions of the shutdown device, as they do not show any activity until an abnormal pressure is detected.

As consequence of the above there is a need for a better mean to sense pressure and provide a simple and reliable safety shutdown device for unattended installations to protect them when the pressure reaches unsafe limits.

BRIEF SUMMARY OF THE INVENTION

The Self-Contained Electronic Pressure Monitoring and Shutdown Device provides the means for a safety process shutdown that is reliable, needs minimal maintenance and provides the operator with direct reading of the process' pressure as well as the high and low pressure settings. Also, it provides a flashing lamp for each specific cause of shutdown and the means to recall the last cause of shutdown after the device has been reset. The invention is constituted of a Switch-Gauge (1) (a pressure gauge with electric contacts for high and low pressure alarms), an Electronic Logic Circuit (2), a Power Module (3), a Pulse Driven Solenoid Valve (4), a "High Pressure" indicator lamp (5), a "Low Pressure" indicator lamp (6), a "Low Battery" indicator lamp (7), a "System OK" indicator lamp (8) a "Reset" momentary switch or pushbutton (9) and a "Test" momentary switch or pushbutton (10). In essence the system uses the Switch-Gauge (1) to sense the high and low pressure conditions and when an abnormal pressure is detected the Electronic Logic Circuit (2) sends one or more consecutive "shutdown" pulses to the Pulse Driven Solenoid Valve (4) which controls a pneumatic or hydraulic signal that initiates the shutdown.

DETAILED DESCRIPTION OF THE INVENTION

Figure 1:
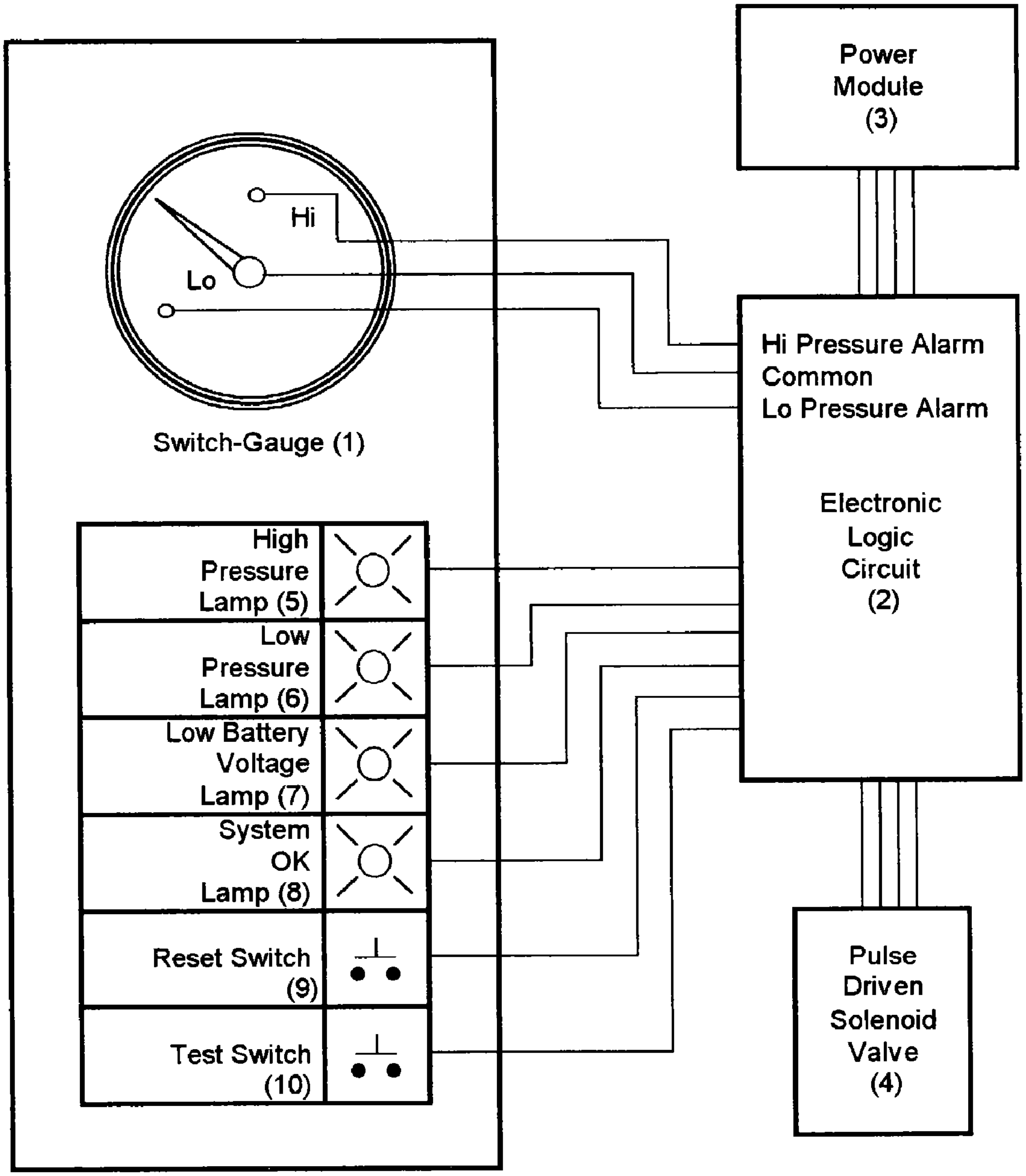
FIG. 1 is a schematic illustrating the general arrangement of the Self-Contained Pressure Monitoring and Shutdown Device.

The device is composed of a Switch-Gauge (1), Electronic Logic Circuit (2), Power Module (3), High Pressure indicating lamp (5), Low Pressure indicating lamp (6), Low Battery indicating lamp (7), System OK indicating lamp (8), a momentary switch or pushbutton "Reset" (9) and a momentary switch or pushbutton "Test" (10).

When operating under normal conditions, the contacts in the Switch-Gauge (1) remain on their normally open condition and the Electronic Logic Circuit (2) remains in a routine of continuously scanning the input signals and periodically reading power voltages. The sign of life in the system is that the "System OK" lamp flashes every one or two seconds to show the operator that the system is working and no abnormal conditions have been detected.

If one of the contacts in the Switch-Gauge (1) goes from its normally open to a close condition (alarm), the Electronic Logic Circuit (2) confirms the alarm by re-scanning and re-confirming it for about one second before taking action. Once the alarm is confirmed, the Electronic Logic Circuit (2) generates one or more consecutive shutdown pulses to trip the Pulse Driven Solenoid Valve (4), causing the shutdown of the process. The subsequent shutdown pulses are for redundancy to insure that action is taken.

It is to be noted that the Electronic Logic Circuit (2) can be jumper-configured by the operator in the field to have a pre-programmed time delay (i.e. 15 seconds) before responding to a high or a low pressure condition. The time delay can be configured independently for the high or the low-pressure alarm and it allows the system to ignore temporary pressure excursions, as those excursions may be normal in some processes.

If a shutdown would occur the Electronic Logic Circuit (2) flashes de corresponding alarm indicator lamp to display the specific cause of it. The alarm indicator lamp will continue to flash even if the Switch-Gauge (1) contact goes back to normal or other alarm is sensed in order to insure that the cause of the shutdown is made known to the operator when he arrives to the location. The device will continue to display the condition causing the shutdown until the operator presses the "Reset" momentary switch or pushbutton (9).

When the "Reset" switch or pushbutton (9) is pressed the alarm lamp turns "off" and the Electronic Logic Circuit (2) pulses the Pulse Driven Solenoid Valve (4) back to "Open"

to allow the process to resume. Also, after the device is "Reset" by the operator the Electronic Logic Circuit (2) will ignore any alarm that may be present for a pre-programmed period of time (i.e. 30 minutes) to allow the process to return to normal. If the alarm continues to be present after that period of time the Electronic Logic Circuit (2) will initiate shutdown again.

If the device detects that one of the battery voltages is reaching below a pre-programmed level, it will blink the Low Battery Voltage lamp (7) instead of the System OK lamp (8) to alert the operator that it is time to replace the batteries. If the batteries are not replaced within reasonable time the voltage will eventually fall below a pre-programmed "low-low" level the Electronic Logic Circuit (2) will initiate shutdown as the low voltage will compromise the device's reliability.

Figure 2:
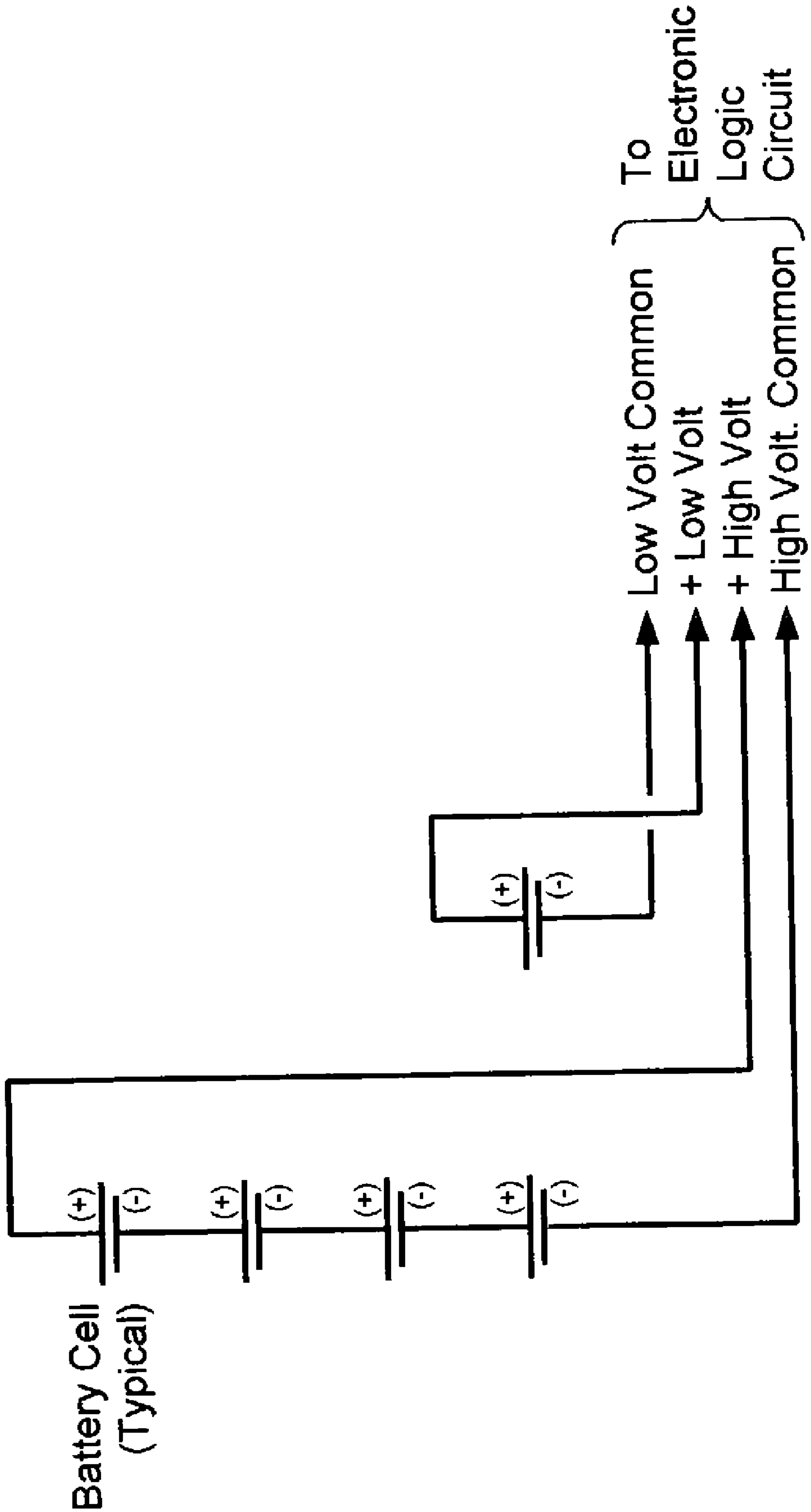
FIG. 2 is a schematic illustrating the interconnection of the battery cells of the Power Module (3).

The Power Module (3), as shown in FIG. 2 is constituted of a number of battery cells, such as lithium batteries and provides two voltages, a low voltage (i.e. 2.2 to 5.5 VDC) for feeding the Electronic Logic Circuit (2) and a separate high voltage (i.e. 6 to 30 VDC) to feed the driver circuits of the Pulse Driven Solenoid Valve (4). Separating the power to the Pulse Driven Solenoid Valve (4) from the power for the Electronic Logic Circuit (2) insures that the Electronic Logic Circuit (2) will not be at all affected by the transients caused by the driving of the Pulse Driven Solenoid Valve (4). It is to be noted that the pulse driven solenoid valves take considerable amount of power while being pulsed and a capacitor of 1,000 uF or bigger may be needed to assist the power module to provide the high current needed to trip the Pulse Driven Solenoid Valve (4).

Given the low power consumption achievable with the current electronic circuits combined with the fact that the pulse driven solenoid valve consumes no power except when being tripped, the power module can be designed to last five (5) or more years before battery replacement is needed.

Figure 3:
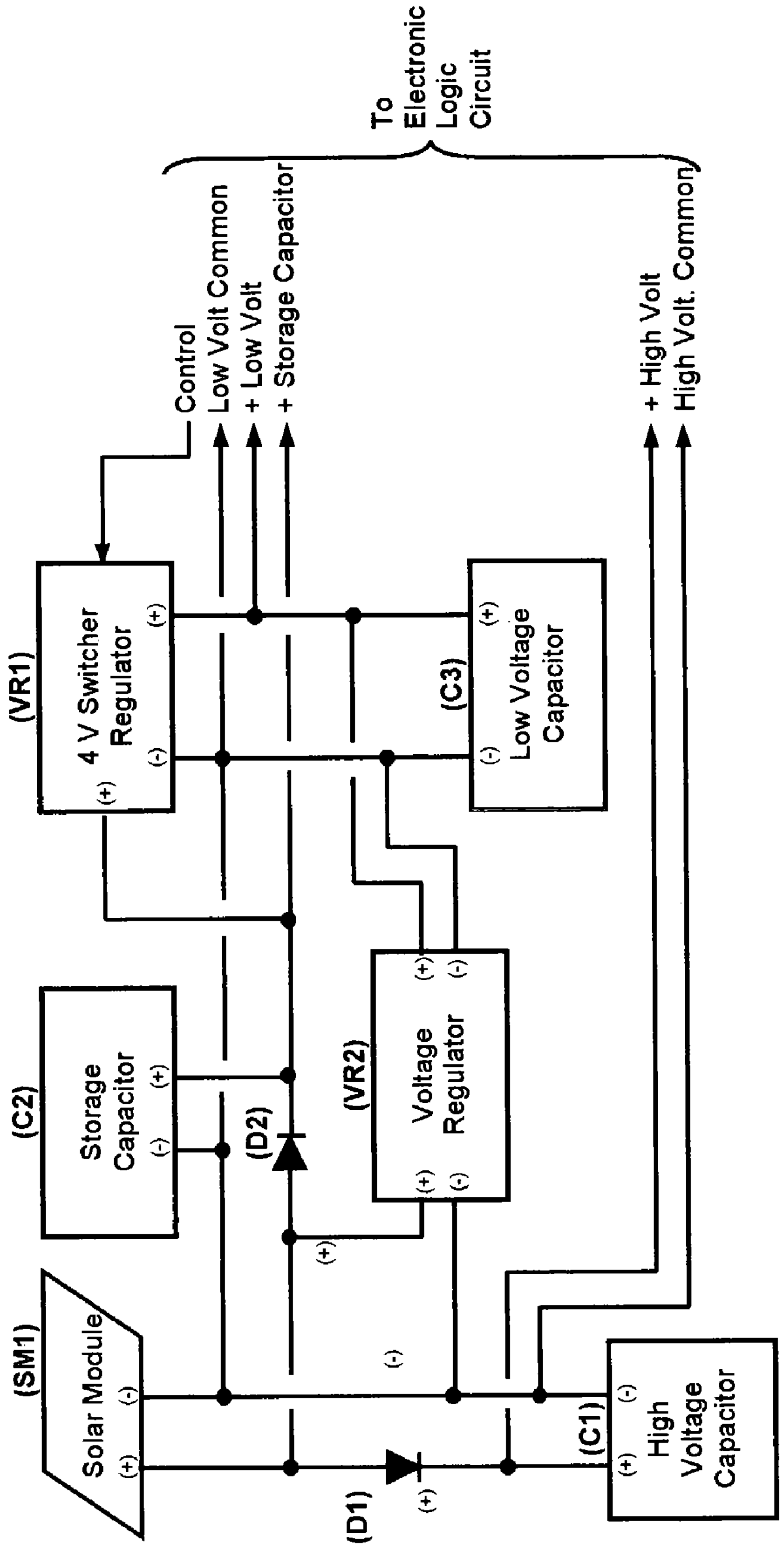
FIG. 3 is a schematic illustrating a battery-less alternative for the Power Module (3-A).

An alternative Power Module (3-A) using no batteries is shown on FIG. 3. In this alternative option the Power Module (3-A) is constituted of a photovoltaic module and three large capacitors (C1, C2 and C3) to store the energy needed to keep the circuits operating throughout the night. In essence the capacitors are used as rechargeable batteries, recharged on a daily basis by the photovoltaic module (SM1). Given the low power used by the system a small solar module will be capable of recharging the capacitors even in cloudy days. The alternative Power Module (3-A) is better suited if the system is to be located in a region where replacement batteries are difficult to obtain or the ambient temperatures are so extreme that using batteries is not advisable.

As shown in FIG. 3, the high voltage capacitor (C1) is charged directly from the solar module (SM1) and it will remain charged throughout the night as the blocking diode (D1) prevents the current from flowing back. The charge stored on the high voltage capacitor (C1) is for driving the pulse driven solenoid valve (4) and there is virtually no discharging unless power is consumed to drive the solenoid valve (4) in the event of a shutdown.

In contrast, the electronic logic module is continuously consuming some current from the low voltage source (roughly 50 uA in current version) and it runs mainly on the energy accumulated in the storage capacitor (C2) which is charged directly from the solar module (SM1) through the second blocking diode (D2). By having a storage capacitor charged at a higher voltage more usable energy is stored for transferring to the low voltage capacitor (C3) by the switcher regulator (VR1). It is to be noted that the switcher regulator (VR1) will not run continuously but it will run and stop as per a control signal from the electronic logic circuit (2). In this alternative design the logic control circuit will be frequently monitoring the voltage on the low voltage capacitor (C3) and will command the switcher to run and transfer energy from the storage capacitor (C2) when the voltage is approaching a low limit (i.e. 3 VDC) and stop once the voltage reaches a high limit (i.e. 4 VDC).

FIG. 3 also shows a second voltage regulator (VR2) connected directly to the solar module and feeding the low voltage capacitor (C3). The function of this circuit is to have the system started when the unit has been stored for a long time and the charge in the capacitors has been completely depleted. In this case the second voltage regulator (VR2) will provide power to activate the electronic logic (2).

Although only an exemplary embodiment of the invention has been described in the detailed description above, those skilled in the art will readily appreciate that many modifications are possible without materially departing from the novel teachings of this invention. Accordingly, all such modifications are intended to be included within the scope of this invention as defined in the following claims.

The invention claimed is:

1. A self-contained electronic pressure monitoring and shutdown device comprising:

a switch-gauge with adjustable high and low pressure electrical contacts to switch an electrical signal corresponding to the respective high and low pressure alarm condition;

a pulse driven solenoid valve;

a high pressure indicator lamp;

a low pressure indicator lamp;

a low battery indicator lamp;

a system OK indicator lamp;

a "Test" manually activated electrical contact;

a "Reset" manually activated electrical contact;

a battery powered power module that supplies two separate voltages for providing independent power sources to the electronic logic circuit and the solenoid valve driver circuits;

an electronic logic circuit electrically coupled to the switch-gauge, pulse driven solenoid valve, indicator lamps and manually activated electrical contacts wherein the electronic logic circuit provides the following logic functions:

generates one or more consecutive shutdown pulses to trip the solenoid valve and flashes the high pressure alarm lamp when a high pressure condition is detected by the switch-gauge and confirmed by re-reading the alarm signal for about one second;

generates one or more consecutive shutdown pulses to trip the solenoid valve and flashes the low pressure alarm lamp when a low pressure condition is detected by the switch-gauge and confirmed by re-reading the alarm signal for about one second;

latches the last cause of shutdown and maintains the corresponding alarm lamp flashing even if the cause for the shutdown is no longer present or a different alarm is detected after the shutdown;

when the "Reset" manually activated electrical contact is actuated by the operator it stops flashing the alarm lamps, generates one or more pulses to open the solenoid valve and ignores existing high and low pressure alarms for a preprogrammed number of minutes to allow the process to reach normal pressure;

flashes the system OK lamp every one or two seconds when no alarms have been detected since the last "Reset";

periodically reads the voltages supplied by the power module to confirm power supply is providing proper voltage;

flashes the low battery voltage lamp when one of the voltages from the power module falls below pre-programmed normal but not low enough to compromise reliable operation.

generates one or more consecutive shutdown pulses to trip the solenoid valve and flashes the low battery voltage alarm lamp when one of the voltages from the power module falls below a preprogrammed "low-low" voltage;

maintains memory of the last cause of shutdown after the system has been reset;

when the "Test" manually activated electrical contact is actuated by the operator it flashes the lamp corresponding to the last cause of shutdown for a few seconds and then flashes each alarm lamp to confirm they are in good working order.

2. The self-contained electronic pressure monitoring and shutdown device of claim 1 wherein the high voltage provided by the power module is connected in parallel with a capacitor of at least 1,000 uF for boosting pulse current capacity.

3. The self-contained electronic pressure monitoring and shutdown device of claim 1 wherein the electronic logic circuit has the means to be configured in such a way that it will delay the alarm and shutdown on the high and/or low pressure alarms for a preprogrammed number of seconds to prevent shutting down the process if the alarm is only temporary.

4. A self-contained electronic pressure monitoring and shutdown device comprising:

a switch-gauge with adjustable high and low pressure electrical contacts to switch an electrical signal corresponding to the respective high and low pressure alarm condition;

a pulse driven solenoid valve;

a high pressure indicator lamp;

a low pressure indicator lamp;

a low battery indicator lamp;

a system OK indicator lamp;

a "Test" manually activated electrical contact;

a "Reset" manually activated electrical contact;

a solar powered power module that stores energy in capacitors, sized to store enough energy to keep the device in operation throughout the night or longer;

an electronic logic circuit electrically coupled to the switch-gauge, pulse driven solenoid valve, indicator lamps and manually activated electrical contacts wherein the electronic logic circuit provides the following logic functions:

generates one or more consecutive shutdown pulses to trip the solenoid valve and flashes' the high pressure alarm lamp when a high pressure condition is detected by the switch-gauge and confirmed by re-reading the alarm signal for about one second;

generates one or more consecutive shutdown pulses to trip the solenoid valve and flashes the low pressure alarm lamp when a low pressure condition is detected by the switch-gauge and confirmed by re-reading the alarm signal for about one second;

latches the last cause of shutdown and maintains the corresponding alarm lamp flashing even if the cause for the shutdown is no longer present or a different alarm is detected after the shutdown;

when the "Reset" manually activated electrical contact is actuated by the operator it stops flashing the alarm lamps, generates one or more pulses to open the solenoid valve and ignores existing high and low pressure alarms for a preprogrammed number of minutes to allow the process to reach normal pressure;

flashes the system OK lamp every one or two seconds when no alarms have been detected since the last "Reset";

periodically reads the voltages of the main capacitors of the power module and controls an output signal to activate a switcher voltage regulator that transfers energy from a high voltage storage capacitor to a low voltage capacitor so the low voltage is kept within a range that insures the reliable operation of the electronic logic module;

generates one or more consecutive shutdown pulses to trip the solenoid valve when any of the main capacitors reaches below a preprogrammed "low-low" voltage;

maintains memory of the last cause of shutdown after the system has been reset;

when the "Test" manually activated electrical contact is actuated by the operator, it flashes the lamp corresponding to the last cause of shutdown for a few seconds and then flashes each alarm lamp to confirm they are in good working order.

5. The self-contained electronic pressure monitoring and shutdown device of claim 4 wherein the electronic logic circuit has the means to be configured in such a way that it will delay the alarm and shutdown on the high and/or low pressure alarms for a preprogrammed number of seconds to prevent shutting down the process if the alarm is only temporary.

* * * * *